(12) United States Patent
Misawa et al.

(10) Patent No.: US 7,061,535 B2
(45) Date of Patent: Jun. 13, 2006

(54) INPUT UNIT, INFORMATION RECORDING APPARATUS AND DIGITAL CAMERA USING THE SAME

(75) Inventors: Takeshi Misawa, Saitama (JP); Toshita Hara, Tokyo (JP); Takeyoshi Ito, Saitama (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 944 days.

(21) Appl. No.: 09/747,926

(22) Filed: Dec. 27, 2000

(65) Prior Publication Data

US 2001/0005229 A1   Jun. 28, 2001

(30) Foreign Application Priority Data

Dec. 27, 1999   (JP) .......................... HEI 11-369511

(51) Int. Cl.
*H04N 5/225* (2006.01)
(52) U.S. Cl. .................... 348/375; 348/333.02
(58) Field of Classification Search ........... 348/333.01, 348/333.02, 333.04, 333.05, 333.11, 375, 348/333.12, 373; 396/291, 281, 292; D16/208, D16/241, 216; 345/901, 903
See application file for complete search history.

(56) References Cited

U.S. PATENT DOCUMENTS

| | | | | |
|---|---|---|---|---|
| 4,712,105 A | * | 12/1987 | Kohler | 340/825.69 |
| 4,987,279 A | * | 1/1991 | Hirose et al. | 200/314 |
| 5,563,631 A | * | 10/1996 | Masunaga | 345/169 |
| 5,585,878 A | * | 12/1996 | Matsukawa | 396/281 |
| 5,749,005 A | * | 5/1998 | Haga et al. | 396/287 |
| 5,832,323 A | * | 11/1998 | Goto | 396/297 |
| 5,835,732 A | * | 11/1998 | Kikinis et al. | 710/303 |
| 6,075,949 A | * | 6/2000 | Hatakenaka et al. | 396/301 |
| 6,118,480 A | * | 9/2000 | Anderson et al. | 348/207.99 |
| 6,154,210 A | * | 11/2000 | Anderson | 345/840 |
| 6,240,347 B1 | * | 5/2001 | Everhart et al. | 701/36 |
| 6,348,772 B1 | * | 2/2002 | May | 318/430 |
| 6,373,462 B1 | * | 4/2002 | Pan et al. | 345/600 |
| 6,385,398 B1 | * | 5/2002 | Matsumoto | 396/52 |
| 6,486,914 B1 | * | 11/2002 | Anderson | 348/333.02 |
| 6,519,003 B1 | * | 2/2003 | Swayze | 348/375 |
| 6,533,757 B1 | * | 3/2003 | Lampropoulos et al. | 604/131 |
| 6,559,773 B1 | * | 5/2003 | Berry | 340/815.4 |
| 6,650,834 B1 | * | 11/2003 | Ume | 396/164 |
| 6,680,749 B1 | * | 1/2004 | Anderson et al. | 348/231.99 |
| 6,683,649 B1 | * | 1/2004 | Anderson | 348/333.05 |
| 6,727,954 B1 | * | 4/2004 | Okada et al. | 348/374 |
| 6,738,075 B1 | * | 5/2004 | Torres et al. | 715/723 |
| 2002/0012066 A1 | * | 1/2002 | Nagai | 348/373 |
| 2002/0082080 A1 | * | 6/2002 | Kojima | 463/31 |

FOREIGN PATENT DOCUMENTS

| | | | |
|---|---|---|---|
| JP | 7219020 | | 8/1995 |
| JP | 11218817 A | * | 8/1999 |
| JP | 11331662 A | * | 11/1999 |
| JP | 2001209482 A | * | 8/2001 |
| JP | 2003187268 A | * | 7/2003 |

* cited by examiner

*Primary Examiner*—Ngoc-Yen Vu
*Assistant Examiner*—Nelson D. Hernandez
(74) *Attorney, Agent, or Firm*—Birch, Stewart, Kolasch & Birch, LLP

(57) ABSTRACT

An information recording apparatus for recording external information of the present invention including an input unit for transmitting a user's instruction to the information recording apparatus. The input unit includes a cross key and a dot matrix display arranged to be wedged in the crossing of the cross key.

83 Claims, 6 Drawing Sheets

INPUT UNIT, INFORMATION RECORDING APPARATUS AND DIGITAL CAMERA USING THE SAME

This patent application claims priority based on a Japanese patent application, H11-369511 filed on Dec. 27, 1999, the contents of which are incorporated herein by reference.

BACKGROUND OF THE INVENTION

1. Field of the Invention

The present invention relates to an input unit, an information recording apparatus, and a digital camera. In particular, the present invention relates to an input unit for inputting a user's instruction to an equipment, and an information recording apparatus and a digital camera that can use such an input unit.

2. Description of the Related Art

Japanese Patent Application Laying-Open No. 7-219020 discloses a camera to which information can be selectively input. The camera can display functions assigned to respective operation switches on a dot-matrix display unit. Thus, a user can operate the camera while confirming the functions.

Recently, digital cameras have greatly developed, and therefore the number of functions that can be set by the user has also increased, thereby making operation of the digital camera by buttons complicated. Thus, there are demands for the development of a new type of input unit that enables user-friendly input.

SUMMARY OF THE INVENTION

Therefore, it is an object of the present invention to provide an input unit and an information recording apparatus that overcome the above issues in the related art. This object is achieved by combinations described in the independent claims. The dependent claims define further advantageous and exemplary combinations of the present invention.

According to the first aspect of the present invention, an input unit for inputting a user's instruction to an equipment, comprises: a cross key; and a dot matrix display arranged to be wedged in a crossing of the cross key.

In an embodiment of the present invention, the dot matrix display displays information related to functions assigned to respective switch portions of the cross key in the vicinity of the switch portions.

In another embodiment of the present invention, the dot matrix display further displays information related to an operation state of the equipment.

In still another embodiment of the present invention, a background color of the dot matrix display is changed in accordance with an operation state of the equipment.

According to the second aspect of the present invention, an input unit for inputting a user's instruction to an equipment, comprises: a dot matrix display; and a plurality of switch portions arranged in surroundings of the dot matrix display at positions sandwiching the dot matrix display so as to be opposed to each other, wherein the dot matrix display displays information related to functions respectively assigned to the switch portions in the vicinity of the switch portions.

In an embodiment of the present invention, the switch portions are respectively arranged at four positions including an upper, a lower, a right, and a left portion of the dot matrix display.

According to the third aspect of the present invention, an input unit for inputting a user's instruction to an equipment, comprises: a dot matrix display; and a switch portion arranged in surroundings of the dot matrix display, wherein a plurality of functions including a function associated with a relative position with respect to the dot matrix display are assigned to the switch portion.

According to the fourth aspect of the present invention, an input unit for inputting a user's instruction to an equipment, comprises: a dot matrix display; and a plurality of switch portions arranged in surroundings of the dot matrix display, wherein functions corresponding to relative positions of the plurality of switch portions with respect to the dot matrix display are assigned to the plurality of switch portions, respectively.

According to the fifth aspect of the present invention, an information recording apparatus for recording external information, comprises an input unit for transmitting a user's instruction to the information recording apparatus, wherein the input unit includes a cross key and a dot matrix display arranged to be wedged in a crossing of the cross key.

In an embodiment of the present invention, the dot matrix display displays information related to functions assigned to respective switch portions of the cross key in the vicinity of respective switch portions.

In another embodiment of the present invention, the information recording apparatus further comprises a mode switch for setting an operation mode of the information recording apparatus, wherein the dot matrix display displays information related to the operation mode set by the mode switch.

In still another embodiment of the present invention, the information recording apparatus further comprises a display unit for displaying the information, wherein the input unit and the display unit are arranged on the same face of the information recording apparatus.

In further another embodiment of the present invention, the input unit is arranged on a face of the information recording apparatus that faces a user when the user uses the information recording apparatus in such a manner that the input unit is positioned at an upper portion of a center of the face on a right side of the center.

In further another embodiment of the present invention, the dot matrix display is arranged to have a plurality of background colors, and one of the plurality of background colors is selected in accordance with an operation mode of the information recording apparatus. The plurality of background colors may include a color for a recording state and another color for a playback state.

According to the sixth aspect of the present invention, a digital camera for capturing an image, comprises: an image-capturing unit operable to capture an image; a capture controlling unit operable to control the image-capturing unit; a processing unit operable to process the image; and an operating unit operable to transmit a user's instruction at least to the processing unit, wherein the operating unit includes a cross key and a dot matrix display arranged to be wedged in a crossing of the cross key.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
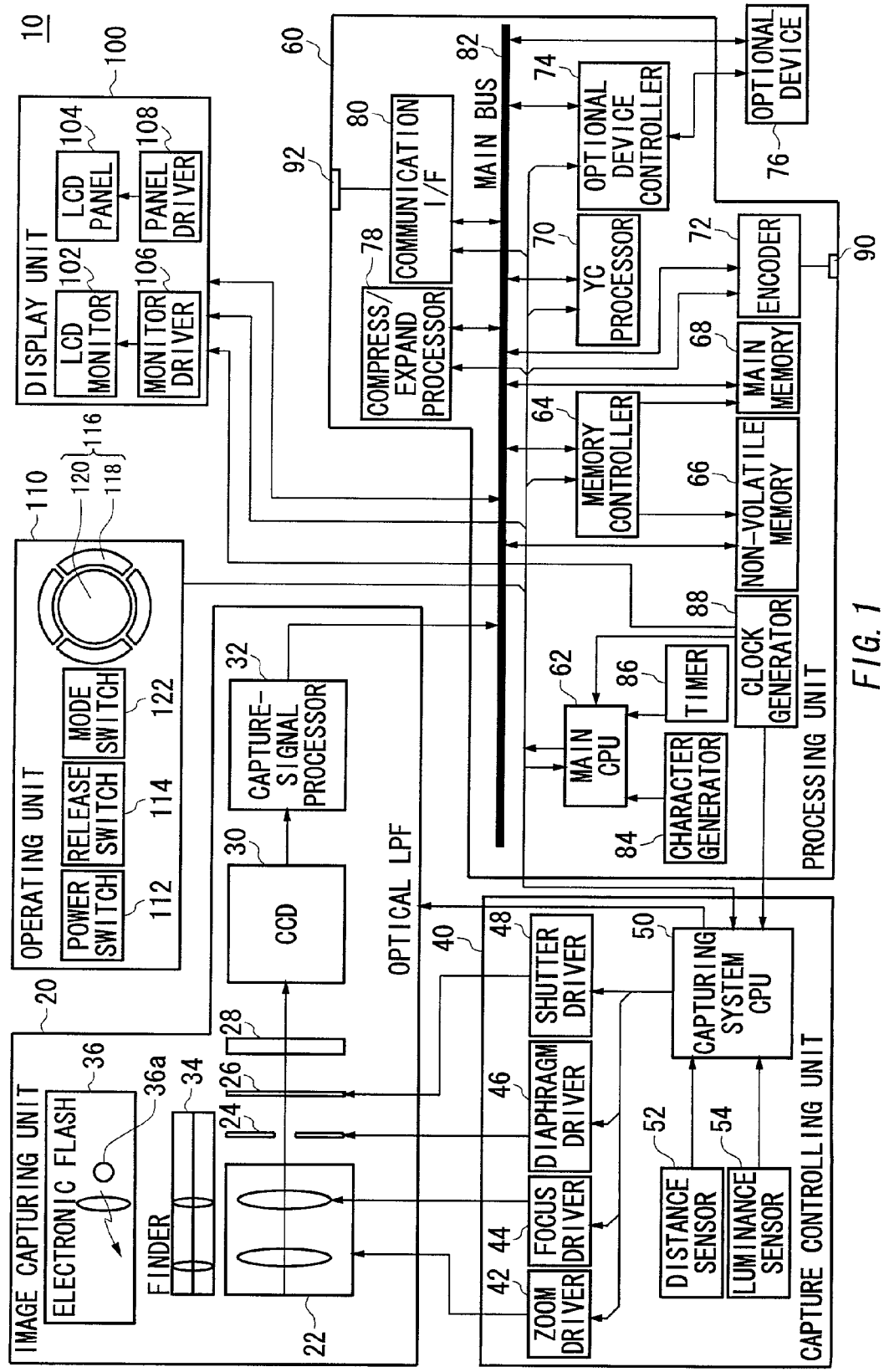
FIG. 1 shows an entire structure of a digital camera according to an embodiment of the present invention.

FIG. 1 shows an entire structure of a digital camera 10 according to an embodiment of the present invention. A characteristic input unit in the present embodiment will be described in detail with reference to FIGS. 2–6C. The digital camera 10 mainly includes an image capturing unit 20, a capture controlling unit 40, a processing unit 60, a display unit 100, and an operating unit 110.

The image capturing unit 20 includes mechanical members and electric members related to an image capturing and an image formation. The image capturing unit 20 includes a lens section 22, a diaphragm 24, a shutter 26, an optical LPF (low-pass filter) 28, a CCD 30, and a capture-signal processor 32. The lens section 22 includes a focus lens, a zoom lens, and the like. This structure allows an image of a subject to be formed on a light receiving surface of the CCD 30. In accordance with the light amount of the formed image of the subject, respective sensor elements (not shown) of the CCD 30 are electrically charged (hereinafter, the electric charges stored in the sensor element are referred to as a "stored electric charge"). The stored electric charges are read by a read-gate pulse into a shift register (not shown), and are then successively read out as a voltage signal by a register transfer pulse.

The digital camera 10 generally has an electronic shutter function. Therefore, it is not necessary for the digital camera 10 to include a mechanical shutter such as the shutter 26. In order to realize the electronic shutter function, a shutter drain is provided with the CCD 30 via a shutter gate. When the shutter gate is driven, the stored electric charges are drained into the shutter drain. By controlling the shutter gate, a time period in which the respective sensor elements are electrically charged, that is, a shutter speed can be controlled.

The voltage signal output from the CCD 30, that is an analog signal, is subjected to color separation for separating the signal into R, G, and B components in the capture-signal processor 32, thereby white balance is adjusted. Next, the capture-signal processor 32 performs gamma correction. Then, the R, G, and B signals are successively subjected to A/D conversion at necessary times. Digital image data obtained by the above operations (hereinafter, simply referred to as "digital image data") is output to the processing unit 60.

The image capturing unit 20 further includes a finder 34 and an electronic flash 36. The finder 34 may includes an LCD (not shown) therein. In this case, various types of information from a main CPU 62 and the like can be displayed within the finder 34. The electronic flash 36 works by emission of light by a discharge tube 36a when energy stored in a condenser (not shown) is supplied to the discharge tube 36a.

The capture controlling unit 40 includes a zoom driver 42, a focus driver 44, a diaphragm driver 46, a shutter driver 48, a capturing system CPU 50 for controlling these drivers, a distance sensor 52, and a luminance sensor 54. Each of the drivers 42, 44, 46, and 48 has a driving means such as a stepping motor. When a release switch 114 described later is pressed down, the distance sensor 52 measures a distance to the subject while the luminance sensor 54 measures a luminance of the subject. The measured data of the distance (hereinafter, simply referred to as "distance data") and the measured data of the luminance (hereinafter, simply referred to as "luminance data") are sent to the capturing system CPU 50. The capturing system CPU 50 performs adjustments of a magnifying power and a focus of the lens section 22 by controlling the zoom driver 42 and the focus driver 44 based on capturing information such as magnification specified by the user.

The capturing system CPU 50 determines the F-number and the shutter speed based on an added value of the R, G, and B digital signals of one image frame, that is, AE information. In accordance with the determined F number and the shutter speed, the diaphragm driver 46 adjusts the size of an aperture and the shutter driver 48 performs opening/closing of the shutter 26.

Moreover, the capturing system CPU 50 controls the light emission by the electronic flash 36 based on the luminance data and also adjusts the aperture size of the diaphragm 26. When the user instructs the digital camera 10 to capture an image, the CCD 30 starts to be electrically charged. After the shutter period calculated from the luminance data has passed, the stored electric charges are output to the capture-signal processor 32.

The processing unit 60 includes a main CPU 62 for controlling the entire digital camera 10, especially the processing unit 60, a memory controller 64, a YC processor 70, an optional device controller 74, a compress/expand processor 78, and a communication interface (I/F) 80 that are controlled by the main CPU 62. The main CPU 62 communicates with the capturing system CPU 50 by serial communication. An operation clock of the main CPU 62 is supplied from a clock generator 88 that also supplies clocks having different frequencies to the capturing system CPU 50 and the display unit 100, respectively.

In addition to the main CPU 62, a character generator 84 and a timer 86 are provided in the processing unit 60. The timer 86 has the backing of a battery cell so that the timer 86 always counts the time and date. Based on the counted values, information regarding the capturing date and other information related to the time are sent to the main CPU 62. The character generator 84 generates character information such as the capturing date, a title of the captured image, or the like. The generated character information is thus appropriately combined with the captured image.

The memory controller 64 controls a non-volatile memory 66 and a main memory 68. The non-volatile memory 66 includes an EEPROM (electrically erasable and programmable ROM) and/or a flash memory or the like, and stores various data to be held even when the power of the digital camera 10 turns off, such as information set by the user, parameters set when the digital camera 10 was shipped, or the like. The non-volatile memory 66 can store a boot program for the main CPU 62 or a system program, if necessary. On the other hand, the main memory 68 is composed of a relatively inexpensive memory having a larger capacity, such as a DRAM, in general. The main memory 68 has a function of a frame memory for storing data output from the image capturing unit 20, a function of a system memory for loading necessary programs, and a function of a working area. The non-volatile memory 66 and the main memory 68 communicate with the parts in the processing unit 60 and other parts outside the processing unit 60 via a main bus 82.

The YC processor 70 subjects the digital image data to YC conversion so as to generate a luminance signal Y and color-difference signals B-Y and R-Y. The luminance signal and the color difference signals are temporarily stored in the main memory 68 by the memory controller 64. The compress/expand controller 78 successively reads the luminance signal and the color-difference signals from the main memory 68 and compresses the read signals. The resultant data (hereinafter, simply referred to as "compressed data") is written into a memory card, that is a kind of optional device 76, via the optional device controller 74.

The processing unit 60 further includes an encoder 72. The encoder 72 inputs the luminance signal and the color-difference signals, converts these input signals into a video signal (NTSC or PAL signal) and then outputs the video signal from a video output terminal 90. In a case where the video signal is generated from the data stored in the optional device 76, the data is first supplied to the compress/expand processor 78 via the optional device controller 74, and is then subjected to a necessary expansion operation in the compress/expand processor 78. Finally, the expanded data is converted into the video signal by the encoder 72.

The optional device controller 74 performs generation of a signal or signals required by the main bus 82 and the optional device 76, logical transform, or voltage conversion in accordance with the specification of signals accepted by the optional device 76 and the bus-specification of the main bus 82. The digital camera 10 may support a device other than the aforementioned memory card, for example, a standard I/O card conforming to PCMCIA. In this case, the optional device controller 74 may be composed of an LSI for controlling a bus for PCMCIA.

The communication I/F 80 controls protocol conversion according to the communication specification supported by the digital camera 10, such as USB, RS-232C, or Ethernet. The communication I/F 80 includes a driver IC, if necessary, and communicates with external equipments including a network via a connector 92. In addition, the digital camera 10 maybe configured to allow data communication with external equipments such as a printer or a game player by means of a special I/F, other than the above-mentioned standard specification.

The display unit 100 includes an LCD monitor 102 and an LCD panel 104 that are controlled by a monitor driver 106 and a panel driver 108, respectively. The LCD monitor 102, that is a 2-inch LCD panel, for example, is provided on the back face of the digital camera 10, and displays a current mode such as a capturing mode or a playback mode, magnification of the image capturing or the playback image, the residual amount of the battery cell, the date, a screen for setting modes, an image of the subject, or the like. On the other hand, the LCD panel 104 is a small monochrome LCD, for example, and is provided on the upper face of the digital camera 10. The LCD panel 104 simply displays information such as the image quality, for example, FINE, NORMAL, BASIC, ON/OFF of the electronic flash, the number of images normally capturable, the number of pixels, the battery capacity, or the like.

The operating unit 110 includes mechanisms and electric members required for the user to set or instruct the operation and the mode of the digital camera 10 to the digital camera 10. A power switch 112 determines whether or not the power of the digital camera 10 turns on/off. The release switch 114 has a two-step structure allowing half-pressing and complete-pressing of it. For example, when the release switch 114 is half-pressed, AF and AE are locked. Then, the release switch 114 is completely pressed, a shot image is taken into the digital camera 10 and is recorded in the main memory 68 and/or the optional device 76 after necessary signal processing and data compression are performed. An input unit 116 includes a cross key 118 and a dot matrix display 120 arranged to be wedged in the crossing of the cross key 118. The input unit 116 also has a function of a zooming switch. The zooming magnification can be set by pressing either of the upper and lower portions of the cross key 118 that serve as switch portions. A mode switch 122 is a rotary dial-type switch that is used for setting an operation mode of the digital camera 10. The operations or functions that can be set by the operating unit 110 include "file format", "special effect", "print", "determine/store", and "change display", for example.

Figure 2:
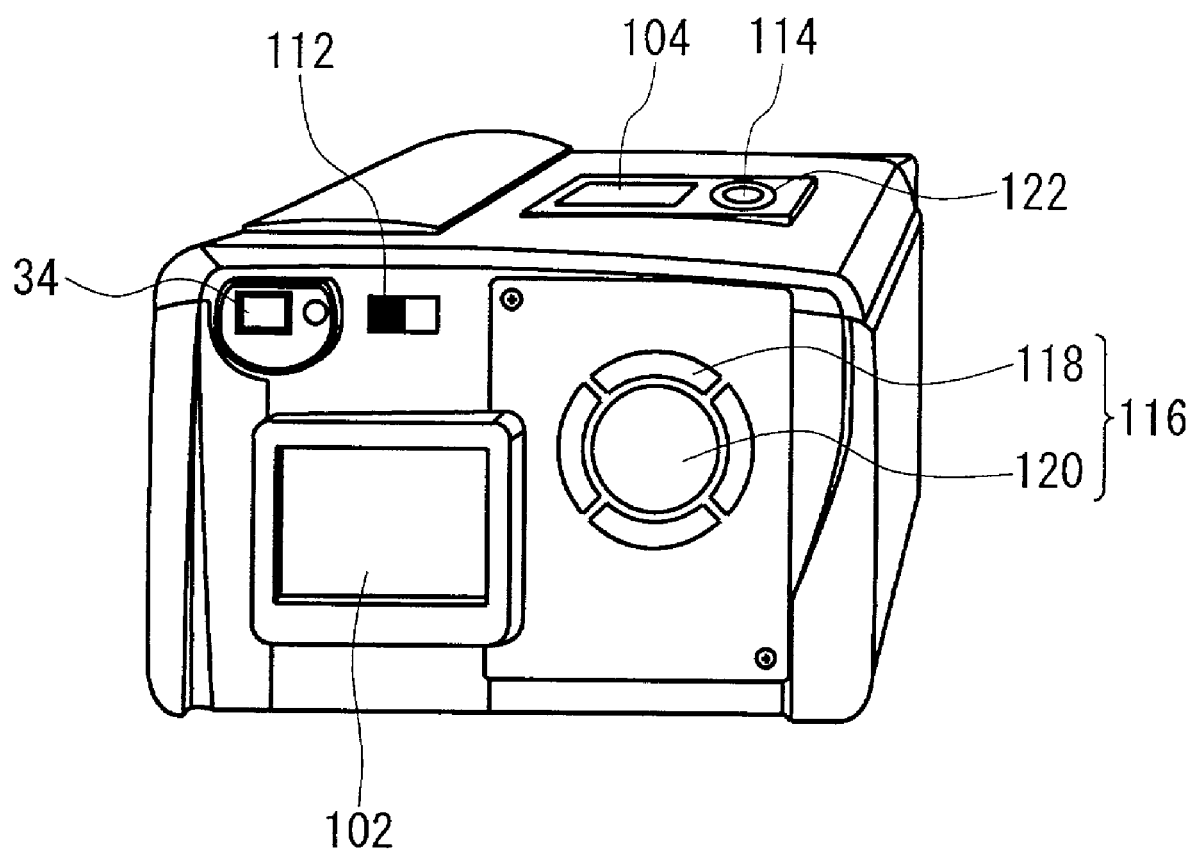
FIG. 2 schematically shows an appearance of the digital camera in the present embodiment.

FIG. 2 shows an appearance of the digital camera 10 in the present embodiment. FIG. 2 is a perspective view schematically showing the digital camera 10 from the upper direction of the face that faces the user when the user uses the digital camera 10. On the surface of the digital camera 10 facing the user, the input unit 116 is arranged. The input unit 116 includes the cross key 118 and the dot matrix display 120 arranged to be wedged in the crossing of the cross key 118, as described above. Various functions are freely assigned to the cross key 118 depending on the operation modes of the digital camera 10. For example, when the digital camera 10 is in a capturing-standby state, the function of the zooming switch is assigned to the cross key 118. When the digital camera 10 is playing a movie, functions of "playback", "stop", "fast-forward", and the like are assigned to the cross key 118. The dot matrix display 120 displays information relevant to the functions of the switch portions of the cross key 118 in the vicinity of the associated switch portions. In addition, at the center of the dot matrix display 120, information related to the operation state of the digital camera 10 is displayed. The contents displayed by the dot matrix display 120 are determined by the main CPU 62 or the like and are transmitted to the dot matrix display 120 via a driver (not shown). The dot matrix display 120 may be driven by a driving method disclosed in Japanese Patent Application Laying Open No. 7-219020, for example.

As described above, the combination of the cross key 118 having high operability and the dot matrix display 120 having high freedom of display can provide the following advantageous effects. First, since various functions are freely assigned to the cross key 118, the number of operation buttons can be reduced. Moreover, since functions necessary for the current operation mode can be assigned to the cross key 118, it is not necessary for the user to look for the button. Thus, the operation of the digital camera 10 can be simplified. In addition, since the dot matrix display 120 displays the information indicating the functions of the switch portions in the vicinity of the corresponding switch portions, the user can operate the digital camera 10 while confirming the functions currently assigned to the cross key 118 even if the functions assigned to the cross key 118 are changed. Also, the functions assigned to the operation buttons are displayed by the dot matrix display 120, it is not necessary to print the functions of the operation buttons on an exterior member of the digital camera 10, thus reducing the cost. Moreover, since the dot matrix display 120 is positioned inside the cross key 118, the information can be displayed in the vicinity of the respective switch portions. Thus, the user can understand how to operate the digital camera by intuition, thereby operating the digital camera without moving the eyes. Furthermore, the arrangement of the cross key 118 and the dot matrix display 120 in the present embodiment can realize a smaller and simpler structure as compared to the case of arranging the cross key 118 and the dot matrix display 120 separately. Furthermore, when the dot matrix display 120 further displays the operation mode of the digital camera, the user can operate the digital camera 10 while confirming the current operation mode without checking the current position of the mode switch 122.

On the face of the digital camera 10 facing the user, the LCD monitor 102 that is an example of the display unit, is provided. In this arrangement, since the LCD monitor 102 and the input unit 116 are arranged on the same face, the user can operate the digital camera 10 while confirming both the contents displayed on the LCD 102 and those displayed on the dot matrix display 120. For example, the LCD monitor 102 may display a menu indicating the functions. In this case, the user can set a desired function by operating the cross key 118 while confirming the contents of the LCD monitor 102.

The input unit 116 is arranged at a portion closer to the upper face of the digital camera 10 than the center of the back face of the digital camera on the right side of the center. Therefore, when the user holds the digital camera 10 by the right hand, the thumb can be placed on the input unit 116. Thus, the user can easily operate the digital camera by a single hand.

In addition, the finder 34, the power switch 112, and the like are provided on the face of the digital camera 10 facing the user.

On the upper face of the digital camera 10, the LCD panel 104, the release switch 114, the mode switch 122, and the like are arranged. The LCD panel 104 is arranged on the upper face of the digital camera 10 in order for the user to easily view the LCD panel 104 when the user uses the digital camera 10. The release switch 114 and the mode switch 122 are arranged at positions where an index finger is placed when the user holds the digital camera 10 by the right hand. Accordingly, a single hand can easily operate the digital camera 10 in the present embodiment.

Figure 3A:
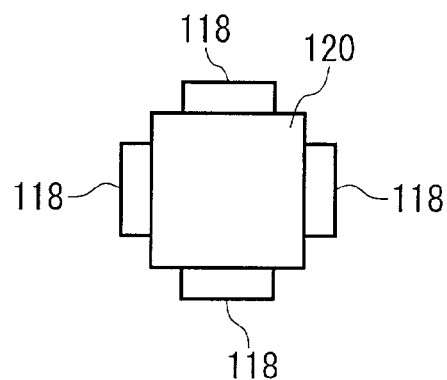
FIGS. 3A, 3B, 3C, and 3D show exemplary shapes of an input unit.
Figure 3B:
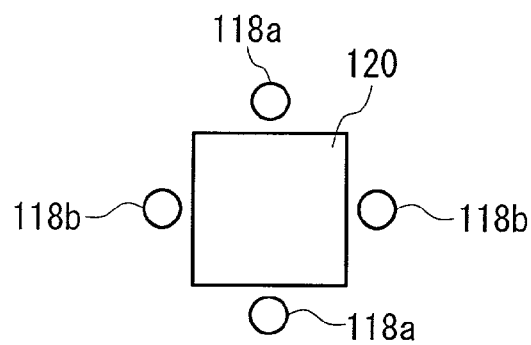
Figure 3C:
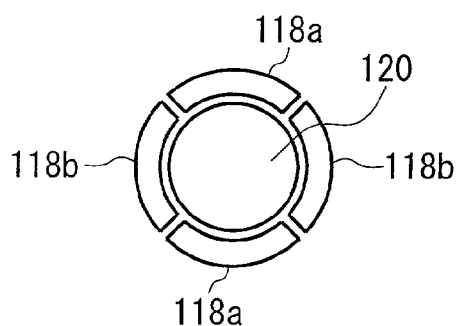
Figure 3D:
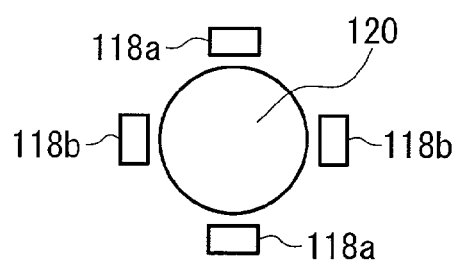

FIGS. 3A, 3B, 3C and 3D show examples of a shape of the input unit 116 in the present embodiment. In FIG. 3A, a square dot matrix display 120 is arranged to be wedged in the crossing of the cross key 118. In FIG. 3B, two pairs of circular switches 118a and 118b are arranged in such a manner that the circular switches in each pair sandwich the square dot matrix display 120 to be opposed to each other. In FIG. 3C, two pairs of switches 118a and 118b are arranged along the circumference of the circular dot matrix display 120 in such a manner that the switches of each pair sandwich the dot matrix display 120. In FIG. 3D, two pairs of rectangular switches 118a and 118b are arranged in such a manner that the rectangular switches of each pair sandwich the circular dot matrix display 120 to be opposed to each other. The shape of the dot matrix display 120 is not limited to the circle or the square, but may be formed in any shape, such as a rectangle or an ellipse. Also, the shape of the switch portions 118 may be formed in any shape. Moreover, the dot matrix display 120 and the switch portions 118 may be arranged in such a manner that the dot matrix display 120 covers the switch portions 118 so that the dot matrix display 120 itself serves to serve as buttons.

The functions assigned to the respective switch portions 118 are associated with a relative direction with respect to the dot matrix display 120. For example, the upper switch portion 118 positioned above the dot matrix display 120 has the functions related to "the upward direction". The functions related to "the upward direction" include, for example, a function of moving the current selected position upwards in the menu screen displayed on the LCD monitor 102. As described above, in a case where upward, downward, right, or left direction needs to be input, the functions corresponding to the relative direction of the respective switch portions 118 with respect to the dot matrix display 120 are assigned to the respective switch portions 118. Thus, the user can understand how to operate the digital camera 10 by intuition. Although it is preferable that the switch portions 118 are arranged at the upper, lower, right and left positions of the dot matrix display 120, only one pair of switch portions may be arranged to be opposed to each other with the dot matrix display 120 sandwiched therebetween by combining the upper and right switch portions and combining the lower and left switch portions. In this case, the number of the switch portions can be reduced.

Figure 4A:
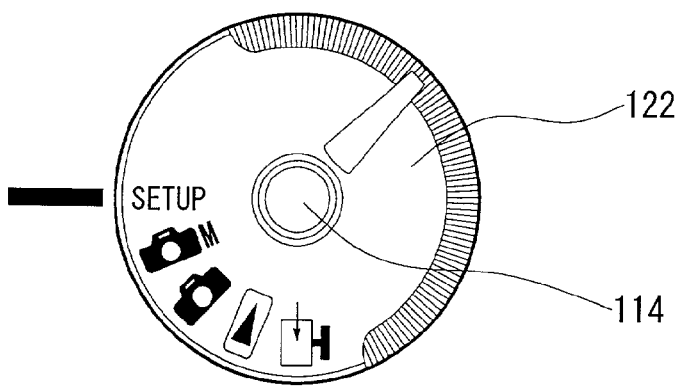
FIGS. 4A, 4B, and 4C show exemplary screens of a dot matrix display and an LCD monitor when the digital camera is in a function setting mode.
Figure 4B:
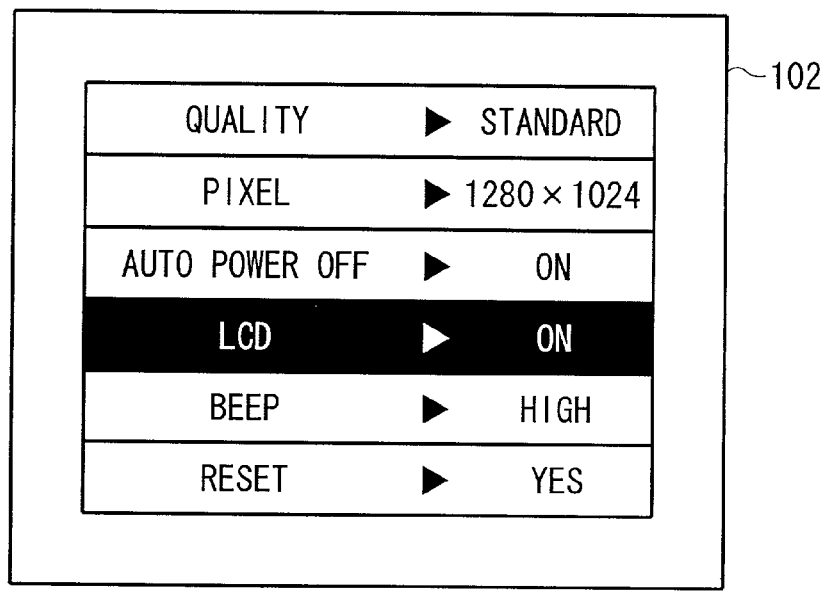
Figure 4C:
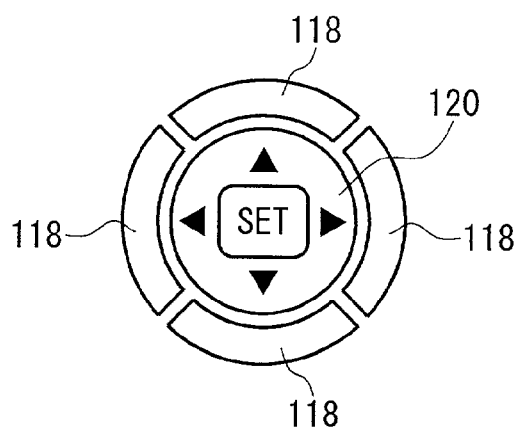

FIGS. 4A, 4B, and 4C show exemplary screens displayed on the LCD monitor 102 and the dot matrix display 120 when the digital camera 10 in the present embodiment is in the function setting mode. FIG. 4A shows a state where the mode switch 122 is set to the function setting mode. FIG. 4B shows the exemplary screen of the LCD monitor 102. The LCD monitor 102 displays a function setting menu. The function currently selected is displayed while being reversed in color. A triangle located on the right side of the name of each function indicates that the setting of the corresponding function can be changed by pressing down the right and left switch portions of the cross key 118. FIG. 4C shows the exemplary screen of the dot matrix display 120. The dot matrix display 120 displays a symbol indicating that the digital camera 10 is now in the function setting mode at the center of the screen and also displays symbols indicating that the respective switch portions of the cross key 118 have functions of the arrow keys in the vicinity of the respective switch portions. For example, the function of moving the currently selected position upwards in the function setting menu is assigned to the upper switch portion, while the function of changing the current setting of the selected menu is assigned to the right switch portion.

Figure 5A:
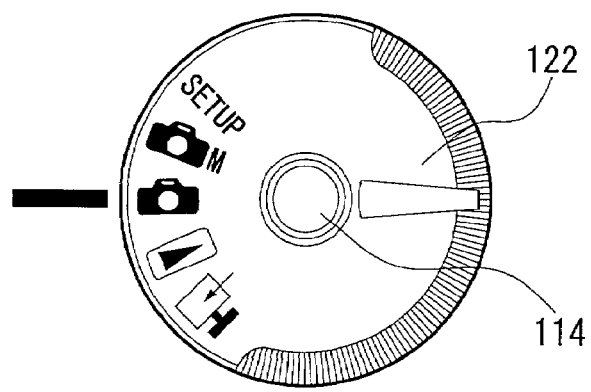
FIGS. 5A, 5B, and 5C show exemplary screens of the dot matrix display and the LCD monitor when the digital camera is in a still-image capture mode.
Figure 5B:
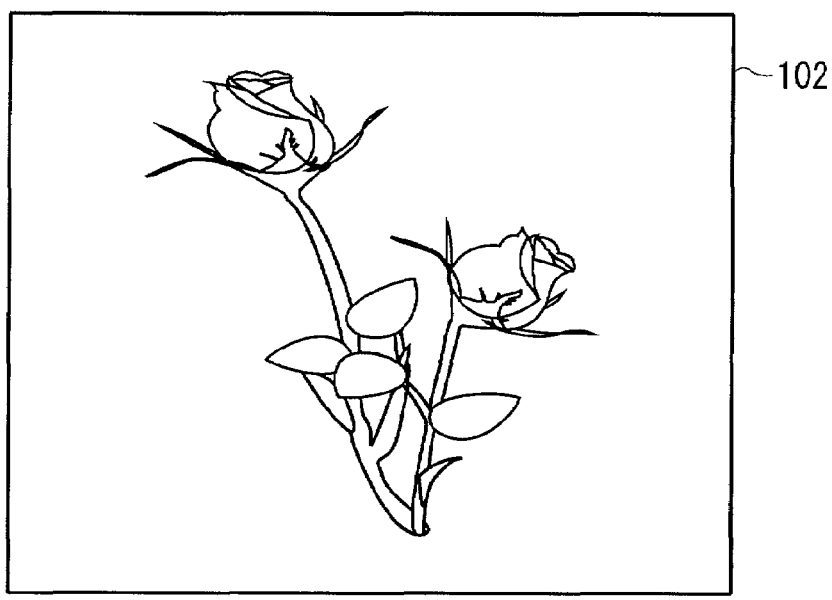
Figure 5C:
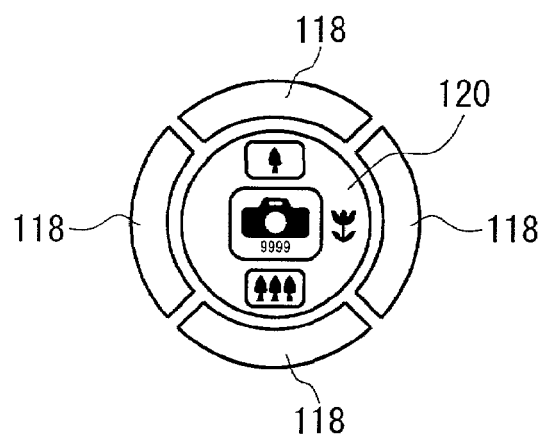

FIGS. 5A, 5B, and 5C show the exemplary screens of the LCD monitor 102 and the dot matrix display 120 when the digital camera 10 is in a still-image capture mode. FIG. 5A shows a state where the mode switch is set to the still-image capture mode. FIG. 5B shows the exemplary screen displayed on the LCD monitor 102. The LCD monitor 102 displays an image shot by the image-capturing unit 20. FIG. 5C shows the exemplary screen displayed on the dot matrix display 120. The dot matrix display 120 displays a symbol indicating that the digital camera 10 is now in the still-image capturing mode at the center of the screen, and also displays symbols indicating the functions as signed to the respective switch portions in the vicinity of the respective switch portions. For example, a zooming (magnifying) function is assigned to the upper switch portion, and a close-up capturing function is assigned to the right switch. As a background color of the dot matrix display 120, orange is selected for indicating that the digital camera 10 is in the capturing mode in the present embodiment. In the case where the magnifying function and a reducing function are assigned to the upper and lower switch portions, respectively, the relative positions of the switch portions with respect to the dot matrix display 120 correspond to the functions of the switch portions. Thus, the user can perform a correct operation even if the user does not know the functions assigned to the respective switch portions or the meaning of the symbols.

Figure 6A:
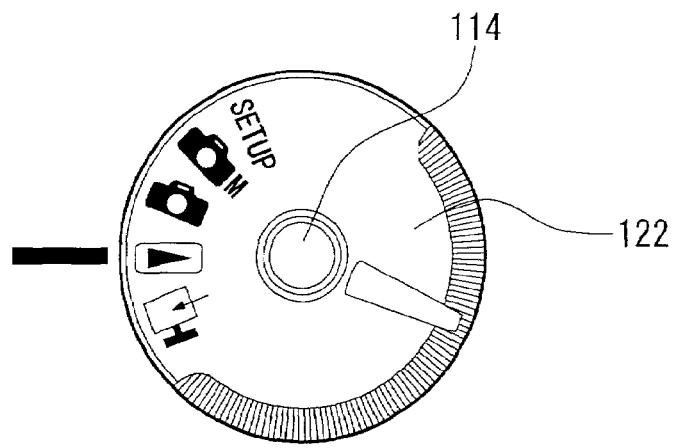
FIGS. 6A, 6B, and 6C show exemplary screens of the dot matrix display and the LCD monitor when the digital camera is in a movie playback mode.
Figure 6B:
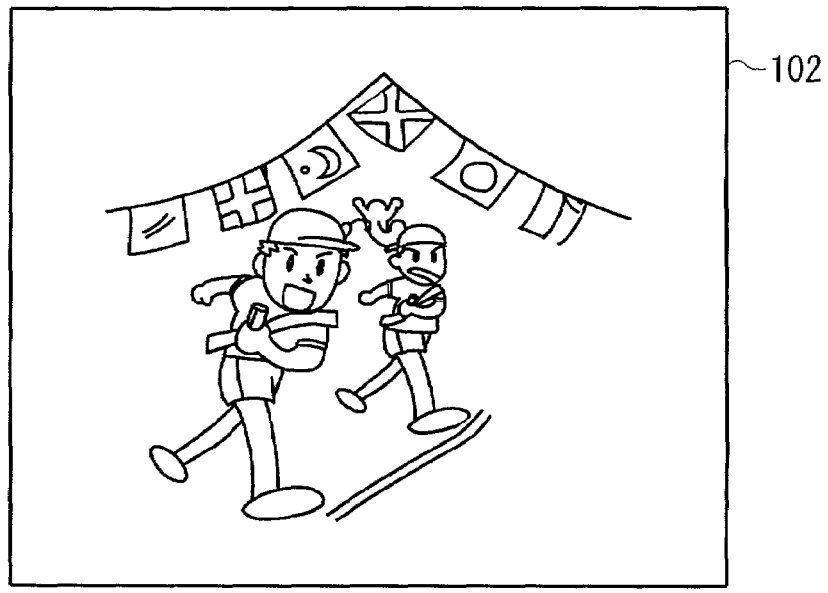
Figure 6C:
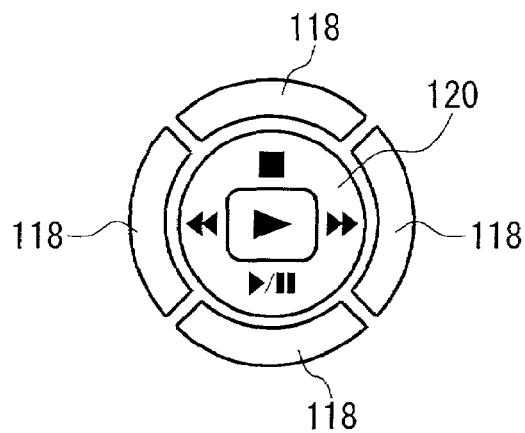

FIGS. 6A, 6B and 6C show exemplary screens displayed on the LCD monitor 102 and the dot matrix display 120, respectively, when the digital camera 10 in the present embodiment is in a movie-playback mode. FIG. 6A shows a state where the mode switch 122 is set to the movie-playback mode. FIG. 6B shows the exemplary screen displayed on the LCD monitor 102. The LCD monitor 102 displays the movie. FIG. 6C shows the exemplary screen displayed on the dot matrix display 120. The dot matrix display 120 displays a symbol indicating that the digital camera 10 is now playing the movie at the center of the screen, and also displays symbols indicating the functions assigned to the respective switch portions in the vicinity of the switch portions. For example, a function of stopping the playback of the movie is assigned to the upper switch portion, while a function of fast-forwarding the movie is assigned to the right switch portion. As the background color of the dot matrix display 120, green is selected for indicating that the digital camera 10 is in a playback mode. By the arrangement described above, the user can understand how to operate the digital camera 10 by intuition, so as to easily operate the digital camera 10 quickly.

The background color of the dot matrix display 120 is determined mainly by the main CPU 62 or the like, in accordance with the operation state of the digital camera 10. The background color of the dot matrix display 120 may be realized by a backlight color. The backlight of the dot matrix display 120 may be turned on only in a predetermined period when the operation mode is changed, and thereafter be turned off. In this case, the power consumption can be reduced. As the backlight of the dot matrix display 120, red and green LEDs may be used, for example. In this case, three colors, i.e., red, green, and orange can be realized. Orange is realized by turning both the red and green LEDs on simultaneously. For example, the background color may be orange when the digital camera 10 is in the capturing mode; green when the digital camera 10 is in the playback mode; and red when the digital camera 10 displays a warning to the user. In this case, the user can find the operation state of the digital camera 10 by intuition. In a case where the dot matrix display 120 is implemented by a color LCD, the background color may be realized by displaying areas other than information such as the symbols, in the same color.

The background color of the dot matrix display 120 may be changed depending on recording folders into which information is recorded. For example, green may be selected as the background color when a folder for a private use is selected, or orange may be selected when a folder for jobs is selected. In this case, the user can find the usage of the recording folder by the background color when the user selects the recording folder, thereby preventing an incorrect operation.

As described above, according to the present invention, an input unit has excellent operability, and an information recording apparatus and a digital camera that can use such an input unit.

Although the present invention has been described by way of exemplary embodiments, it should be understood that many changes and substitutions may be made by those skilled in the art without departing from the spirit and the scope of the present invention which is defined only by the appended claims.

What is claimed is:

1. An input unit disposed on an equipment having a plurality of operation modes, for inputting a user's instruction to the equipment, comprising:
   a display for presenting at least a function corresponding to the operation mode selected by the user, said function being different in accordance with the operation mode selected by the user; and
   a switch portion arranged in surroundings of said display, said switch portion being physically disposed on the input unit, and said switch portion being assigned to the function associated with a relative position with respect to said display,
   wherein said display displays information related to the operation mode selected by the user at the center thereof, and
   wherein said information related to the function assigned to said respective switch portions is presented as a symbol.

2. The input unit as claimed in claim 1, wherein said information related to the operation mode selected by the user is presented as a symbol.

3. The input unit as claimed in claim 2, wherein a background color of said display is changed in accordance with an operation state of the equipment.

4. The input unit as claimed in claim 1, wherein said switch portions surround substantially the entire circumference of said display.

5. The input unit as claimed in claim 1, further comprising:
   a cross key having a crossing part and switch portions, said cross key being physically disposed on the input unit; and
   a display for presenting at least a function corresponding to the operation mode selected by the user, arranged to be wedged in said crossing part of said cross key, said function being different in accordance with the operation mode selected by the user,
   wherein said display displays in the vicinity of said switch portions information related to the function assigned to at least one of said respective switch portions.

6. The input unit as claimed in claim 1, further comprising:
   a display for presenting at least a function corresponding to the operation mode selected by the user, said function being different in accordance with the operation mode selected by the user; and
   a plurality of switch portions arranged in surroundings of said display at positions sandwiching said display so as to oppose to each other, said switch portions being physically disposed on the input unit,
   wherein said display displays in the vicinity of said switch portions information related to the functions respectively assigned to said switch portions.

7. The input unit as claimed in claim 1, further comprising:
a display for presenting functions corresponding to the operation mode selected by the user, said function being different in accordance with the operation mode selected by the user; and
a plurality of switch portions arranged in surroundings of said display, said switch portions being physically disposed on the input unit, and said switch portions respectively being assigned to the functions corresponding to relative positions of said plurality of switch portions with respect to said display.

8. The input unit as claimed in claim 1, wherein said display further displays information related to an operation state of the equipment.

9. The input unit as claimed in claim 1, wherein said switch portions are respectively arranged at four positions including an upper, a lower, a right, and a left portion of said display.

10. The input unit as claimed in claim 1, wherein said display displays information related to the operation mode selected by the user as a first icon and information related to the function assigned to said respective switch portions as a second icon, and said first icon is larger than said second icon.

11. An information recording apparatus for recording external information, including an input unit disposed on the recording apparatus for transmitting a user's instruction to said information recording apparatus,
said input unit comprising
a mode switch for setting an operation mode of said information recording apparatus;
a cross key having switch portions, said cross key being physically disposed on the recording apparatus; and
a display arranged to be wedged in a crossing of said cross key for presenting at least a function corresponding to the operation mode selected by the user, said function being different in accordance with the operation mode selected by the user,
wherein said display displays in the vicinity of said switch portions information related to the functions assigned to at least one of said respective switch portions,
wherein said display displays information related to the operation mode selected by the user at the center thereof, and
wherein said information related to the function assigned to said respective switch portions is presented as a symbol.

12. The information recording apparatus as claimed in claim 11, further comprising a display unit for displaying said information,
wherein said input unit and said display unit are arranged on the same face of said information recording apparatus as each other.

13. The information recording apparatus as claimed in claim 11, further comprising a display unit for displaying said information,
wherein said input unit and said display unit are arranged on the same face of said information recording apparatus as each other.

14. The information recording apparatus as claimed in claim 11, wherein said input unit is arranged on a face of said information recording apparatus that faces a user when the user uses said information recording apparatus in such a manner that said input unit is positioned at an upper portion of a center of the face on a right side of the center.

15. The information recording apparatus as claimed in claim 11, wherein said display is arranged to have a plurality of background colors, and one of said plurality of background colors is selected in accordance with an operation mode of said information recording apparatus.

16. The information recording apparatus as claimed in claim 15, wherein said plurality of background colors include a color for a recording state and another color for a playback state.

17. The information recording apparatus as claimed in claim 11, wherein said information related to the operation mode selected by the user is presented as a symbol.

18. The information recording apparatus as claimed in claim 17, wherein a background color of said display is changed in accordance with an operation state of the equipment.

19. The information recording apparatus as claimed in claim 11, wherein said switch portions surround substantially the entire circumference of said display.

20. The information recording apparatus as claimed in claim 11, wherein said display further displays information related to an operation state of the equipment.

21. The information recording apparatus as claimed in claim 11, wherein said switch portions are respectively arranged at four positions including an upper, a lower, a right, and a left portion of said display.

22. The information recording apparatus as claimed in claim 11, wherein said display displays information related to the operation mode selected by the user as a first icon and information related to the function assigned to said respective switch portions as a second icon, and said first icon is larger than said second icon.

23. A digital camera for capturing an image, comprising:
a mode switch for setting an operation mode of the digital camera;
an image-capturing unit operable to capture an image;
a capture controlling unit operable to control said image-capturing unit;
a processing unit operable to process said image; and
an operating unit operable to transmit a user's instruction at least to said processing unit disposed on the digital camera,
said operating unit comprising
a cross key having switch portions, said cross key being physically disposed on the digital camera; and
a display for presenting at least a function corresponding to the operation mode selected by the user, arranged to be wedged in a crossing of said cross key, said function being different in accordance with the operation mode selected by the user, wherein said display displays in the vicinity of said switch portions information related to the functions assigned to at least one of said respective switch portions,
wherein said display displays information related to the operation mode selected by the user at the center thereof, and
wherein said information related to the function assigned to said respective switch portions is presented as a symbol.

24. The digital camera as claimed in claim 23, wherein said information related to the operation mode selected by the user is presented as a symbol.

25. The digital camera as claimed in claim 24, wherein a background color of said display is changed in accordance with an operation state of the equipment.

26. The digital camera as claimed in claim 23, wherein said switch portions surround substantially the entire circumference of said display.

27. The digital camera as claimed in claim 23, wherein said display further displays information related to an operation state of the equipment.

28. The digital camera as claimed in claim 23, wherein said switch portions are respectively arranged at four positions including an upper, a lower, a right, and a left portion of said display.

29. The digital camera as claimed in claim 23, wherein said display displays information related to the operation mode selected by the user as a first icon and information related to the function assigned to said respective switch portions as a second icon, and said first icon is larger than said second icon.

30. An information recording apparatus for recording external information, including an input unit disposed on the recording apparatus for transmitting a user's instruction to said information recording apparatus,
    said input unit comprising
    a mode switch for setting an operation mode of said information recording apparatus;
    a cross key having switch portions, said cross key being physically disposed on the recording apparatus; and
    a display arranged to be wedged in a crossing of said cross key for presenting at least a function corresponding to the operation mode selected by the user, said function being different in accordance with the operation mode selected by the user,
    wherein said display displays in the vicinity of said switch portions information related to the functions assigned to at least one of said respective switch portions,
    wherein said input unit is arranged on a face of said information recording apparatus that faces a user when the user uses said information recording apparatus in such a manner that said input unit is positioned at an upper portion of a center of the face on a right side of the center.

31. The information recording apparatus as claimed in claim 30, further comprising a display unit for displaying said information,
    wherein said input unit and said display unit are arranged on the same face of said information recording apparatus as each other.

32. The information recording apparatus as claimed in claim 30, further comprising a display unit for displaying said information,
    wherein said input unit and said display unit are arranged on the same face of said information recording apparatus as each other.

33. The information recording apparatus as claimed in claim 30, wherein said display is arranged to have a plurality of background colors, and one of said plurality of background colors is selected in accordance with an operation mode of said information recording apparatus.

34. The information recording apparatus as claimed in claim 33, wherein said plurality of background colors include a color for a recording state and another color for a playback state.

35. The information recording apparatus as claimed in claim 30, wherein said display displays information related to the operation mode selected by the user at the center thereof.

36. The information recording apparatus as claimed in claim 35, wherein said information related to the function assigned to said respective switch portions is presented as a symbol.

37. The information recording apparatus as claimed in claim 36, wherein said information related to the operation mode selected by the user is presented as a symbol.

38. The information recording apparatus as claimed in claim 37, wherein a background color of said display is changed in accordance with an operation state of the equipment.

39. The information recording apparatus as claimed in claim 30, wherein said switch portions surround substantially the entire circumference of said display.

40. The information recording apparatus as claimed in claim 30, wherein said display further displays information related to an operation state of the equipment.

41. The information recording apparatus as claimed in claim 30, wherein said switch portions are respectively arranged at four positions including an upper, a lower, a right, and a left portion of said display.

42. The information recording apparatus as claimed in claim 30, wherein said display displays information related to the operation mode selected by the user as a first icon and information related to the function assigned to said respective switch portions as a second icon, and said first icon is larger than said second icon.

43. A digital camera for capturing an image, comprising:
    a mode switch for setting an operation mode of the digital camera;
    an image-capturing unit operable to capture an image;
    a capture controlling unit operable to control said image-capturing unit;
    a processing unit operable to process said image; and
    an operating unit operable to transmit a user's instruction at least to said processing unit disposed on the digital camera,
    said operating unit comprising
        a cross key having switch portions, said cross key being physically disposed on the digital camera; and
        a display for presenting at least a function corresponding to the operation mode selected by the user, arranged to be wedged in a crossing of said cross key, said function being different in accordance with the operation mode selected by the user, wherein said display displays in the vicinity of said switch portions information related to the functions assigned to at least one of said respective switch portions,
    wherein an input unit is arranged on a face of said digital camera that faces a user when the user uses said digital camera in such a manner that said input unit is positioned at an upper portion of a center of the face on a right side of the center.

44. The digital camera as claimed in claim 43, wherein said display displays information related to the operation mode selected by the user at the center thereof.

45. The digital camera as claimed in claim 44, wherein said information related to the function assigned to said respective switch portions is presented as a symbol.

46. The digital camera as claimed in claim 45, wherein said information related to the operation mode selected by the user is presented as a symbol.

47. The digital camera as claimed in claim 46, wherein a background color of said display is changed in accordance with an operation state of the equipment.

48. The digital camera as claimed in claim 43, wherein said switch portions surround substantially the entire circumference of said display.

49. The digital camera as claimed in claim 43, wherein said display further displays information related to an operation state of the equipment.

50. The digital camera as claimed in claim 43, wherein said switch portions are respectively arranged at four positions including an upper, a lower, a right, and a left portion of said display.

51. The digital camera as claimed in claim 43, wherein said display displays information related to the operation mode selected by the user as a first icon and information related to the function assigned to said respective switch portions as a second icon, and said first icon is larger than said second icon.

52. An input unit disposed on an equipment having a plurality of operation modes, for inputting a user's instruction to the equipment, comprising:
   a display for presenting at least a function corresponding to the operation mode selected by the user, said function being different in accordance with the operation mode selected by the user; and
   a switch portion arranged in surroundings of said display, said switch portion being physically disposed on the input unit, and said switch portion being assigned to the function associated with a relative position with respect to said display,
   wherein said display displays information related to the operation mode selected by the user as a first icon and information related to the function assigned to said respective switch portions as a second icon, and said first icon is larger than said second icon.

53. The input unit as claimed in claim 52, wherein said display displays information related to the operation mode selected by the user at the center thereof.

54. The input unit as claimed in claim 53, wherein said information related to the function assigned to said respective switch portions is presented as a symbol.

55. The input unit as claimed in claim 54, wherein said information related to the operation mode selected by the user is presented as a symbol.

56. The input unit as claimed in claim 55, wherein a background color of said display is changed in accordance with an operation state of the equipment.

57. The input unit as claimed in claim 52, wherein said switch portions surround substantially the entire circumference of said display.

58. The input unit as claimed in claim 52, further comprising:
   a cross key having a crossing part and switch portions, said cross key being physically disposed on the input unit; and
   a display for presenting at least a function corresponding to the operation mode selected by the user, arranged to be wedged in said crossing part of said cross key, said function being different in accordance with the operation mode selected by the user,
   wherein said display displays in the vicinity of said switch portions information related to the function assigned to at least one of said respective switch portions.

59. The input unit as claimed in claim 52, further comprising:
   a display for presenting at least a function corresponding to the operation mode selected by the user, said function being different in accordance with the operation mode selected by the user; and
   a plurality of switch portions arranged in surroundings of said display at positions sandwiching said display so as to oppose to each other, said switch portions being physically disposed on the input unit,
   wherein said display displays in the vicinity of said switch portions information related to the functions respectively assigned to said switch portions.

60. The input unit as claimed in claim 52, further comprising:
   a display for presenting functions corresponding to the operation mode selected by the user, said function being different in accordance with the operation mode selected by the user; and
   a plurality of switch portions arranged in surroundings of said display, said switch portions being physically disposed on the input unit, and said switch portions respectively being assigned to the functions corresponding to relative positions of said plurality of switch portions with respect to said display.

61. The input unit as claimed in claim 52, wherein said display further displays information related to an operation state of the equipment.

62. The input unit as claimed in claim 52, wherein said switch portions are respectively arranged at four positions including an upper, a lower, a right, and a left portion of said display.

63. An information recording apparatus for recording external information, including an input unit disposed on the recording apparatus for transmitting a user's instruction to said information recording apparatus,
   said input unit comprising
   a mode switch for setting an operation mode of said information recording apparatus;
   a cross key having switch portions, said cross key being physically disposed on the recording apparatus; and
   a display arranged to be wedged in a crossing of said cross key for presenting at least a function corresponding to the operation mode selected by the user, said function being different in accordance with the operation mode selected by the user,
   wherein said display displays in the vicinity of said switch portions information related to the functions assigned to at least one of said respective switch portions,
   wherein said display displays information related to the operation mode selected by the user as a first icon and information related to the function assigned to said respective switch portions as a second icon, and said first icon is larger than said second icon.

64. The information recording apparatus as claimed in claim 63, further comprising a display unit for displaying said information,
   wherein said input unit and said display unit are arranged on the same face of said information recording apparatus as each other.

65. The information recording apparatus as claimed in claim 63, further comprising a display unit for displaying said information,
   wherein said input unit and said display unit are arranged on the same face of said information recording apparatus as each other.

66. The information recording apparatus as claimed in claim 63, wherein said input unit is arranged on a face of said information recording apparatus that faces a user when the user uses said information recording apparatus in such a manner that said input unit is positioned at an upper portion of a center of the face on a right side of the center.

67. The information recording apparatus as claimed in claim 63, wherein said display is arranged to have a plurality of background colors, and one of said plurality of background colors is selected in accordance with an operation mode of said information recording apparatus.

68. The information recording apparatus as claimed in claim 67, wherein said plurality of background colors include a color for a recording state and another color for a playback state.

69. The information recording apparatus as claimed in claim 63, wherein said display displays information related to the operation mode selected by the user at the center thereof.

70. The information recording apparatus as claimed in claim 69, wherein said information related to the function assigned to said respective switch portions is presented as a symbol.

71. The information recording apparatus as claimed in claim 70, wherein said information related to the operation mode selected by the user is presented as a symbol.

72. The information recording apparatus as claimed in claim 71, wherein a background color of said display is changed in accordance with an operation state of the equipment.

73. The information recording apparatus as claimed in claim 63, wherein said switch portions surround substantially the entire circumference of said display.

74. The information recording apparatus as claimed in claim 63, wherein said display further displays information related to an operation state of the equipment.

75. The information recording apparatus as claimed in claim 63, wherein said switch portions are respectively arranged at four positions including an upper, a lower, a right, and a left portion of said display.

76. A digital camera for capturing an image, comprising:
- a mode switch for setting an operation mode of the digital camera;
- an image-capturing unit operable to capture an image;
- a capture controlling unit operable to control said image-capturing unit;
- a processing unit operable to process said image; and
- an operating unit operable to transmit a user's instruction at least to said processing unit disposed on the digital camera, said operating unit comprising
- a cross key having switch portions, said cross key being physically disposed on the digital camera; and
- a display for presenting at least a function corresponding to the operation mode selected by the user, arranged to be wedged in a crossing of said cross key, said function being different in accordance with the operation mode selected by the user, wherein said display displays in the vicinity of said switch portions information related to the functions assigned to at least one of said respective switch portions, wherein said display displays information related to the operation mode selected by the user as a first icon and information related to the function assigned to said respective switch portions as a second icon, and said first icon is larger than said second icon.

77. The digital camera as claimed in claim 76, wherein said display displays information related to the operation mode selected by the user at the center thereof.

78. The digital camera as claimed in claim 77, wherein said information related to the function assigned to said respective switch portions is presented as a symbol.

79. The digital camera as claimed in claim 78, wherein said information related to the operation mode selected by the user is presented as a symbol.

80. The digital camera as claimed in claim 79, wherein a background color of said display is changed in accordance with an operation state of the equipment.

81. The digital camera as claimed in claim 76, wherein said switch portions surround substantially the entire circumference of said display.

82. The digital camera as claimed in claim 76, wherein said display further displays information related to an operation state of the equipment.

83. The digital camera as claimed in claim 76, wherein said switch portions are respectively arranged at four positions including an upper, a lower, a right, and a left portion of said display.

* * * * *